United States Patent
Nagata et al.

(10) Patent No.: US 7,418,948 B2
(45) Date of Patent: Sep. 2, 2008

(54) FUEL PUMP HAVING MOTOR ARRANGEMENT AND PUMP ARRANGEMENT

(75) Inventors: Kiyoshi Nagata, Nagoya (JP); Masaya Otake, Kariya (JP)

(73) Assignee: Denso Corporation (JP)

( * ) Notice: Subject to any disclaimer, the term of this patent is extended or adjusted under 35 U.S.C. 154(b) by 0 days.

(21) Appl. No.: 11/590,767

(22) Filed: Nov. 1, 2006

(65) Prior Publication Data

US 2007/0098574 A1 May 3, 2007

(30) Foreign Application Priority Data

Nov. 2, 2005 (JP) ............... 2005-319228

(51) Int. Cl.
*F02M 37/04* (2006.01)
*F04B 17/00* (2006.01)

(52) U.S. Cl. .................... 123/497; 417/321; 417/410.1; 417/423.1; 417/423.8

(58) Field of Classification Search ................. 123/497; 417/423.1, 423.8, 410.1, 321; 415/76
See application file for complete search history.

(56) References Cited

U.S. PATENT DOCUMENTS

| | | | | |
|---|---|---|---|---|
| 5,015,159 | A * | 5/1991 | Mine et al. ................... | 417/366 |
| 7,015,396 | B2 * | 3/2006 | Wada et al. ............... | 174/110 N |
| 2003/0160533 | A1 * | 8/2003 | Suzuki et al. ............... | 310/218 |
| 2005/0074343 | A1 | 4/2005 | Naito | |
| 2005/0220641 | A1 * | 10/2005 | Nagata et al. ............ | 417/423.3 |

FOREIGN PATENT DOCUMENTS

| | | |
|---|---|---|
| CN | 2222981 | 2/1996 |
| JP | 5-340345 | 12/1993 |
| JP | 2005012861 A * | 1/2005 |
| JP | 2005-110477 | 4/2005 |

OTHER PUBLICATIONS

Chinese Office Action dated Feb. 15, 2008 issued in corresponding Chinese Application No. 200610142912.8 with English translation.
Chinese Office Action dated Feb. 15, 2008 issued corresponding Chinese Application No. 200610142912.8 with English translation.

* cited by examiner

Primary Examiner—Stephen K. Cronin
Assistant Examiner—J. Page Hufty
(74) Attorney, Agent, or Firm—Nixon & Vanderhye PC

(57) ABSTRACT

A stator core of a motor arrangement includes six cores, which are arranged one after another in a circumferential direction. A bobbin, which is made of dielectric resin, is fitted to each core. Each coil is formed such that a winding is wound around the bobbin through a concentrated winding technique. Dielectric resin is filled between each circumferentially adjacent two teeth to cover each coil. Furthermore, the dielectric resin is molded to form clearances, each of which is formed between the corresponding circumferentially adjacent two teeth on a rotor side. Fuel, which is pressurized by a pump arrangement, passes an interior of the motor arrangement through a fuel passage, which is a gap between an inner peripheral surface of the stator core and an outer peripheral surface of the rotor, and also through the clearances.

5 Claims, 3 Drawing Sheets

FUEL PUMP HAVING MOTOR ARRANGEMENT AND PUMP ARRANGEMENT

CROSS REFERENCE TO RELATED APPLICATION

This application is based on and incorporates herein by reference Japanese Patent Application No. 2005-319228 filed on Nov. 2, 2005.

BACKGROUND OF THE INVENTION

1. Field of the Invention

The present invention relates to a fuel pump that has a motor arrangement and a pump arrangement.

2. Description of Related Art

For instance, Japanese Unexamined Patent Publication No. 2005-110477 and Japanese Unexamined Patent Publication No. 2005-110478 (corresponding to US 2005/0074343 A1) recite a fuel pump, which includes a brushless motor to form a motor arrangement that drives a pump arrangement. In this fuel pump, fuel, which is pumped by the pump arrangement, passes through an interior of the motor arrangement. In the brushless motor, there is no disadvantageous loss caused by a sliding resistance between a commutator and brushes, an electric resistance between the commutator and the brushes and a flow resistance experienced by the respective groove between segments of the commutator, which all occur in a brush motor. As a result, a motor efficiency of the brushless motor is higher than that of the brush motor, and thereby an efficiency of the above fuel pump is improved. The efficiency of the fuel pump is a ratio of a work output of the fuel pump, i.e., a value of (a fuel delivery pressure)×(a fuel delivery quantity) with respect to the amount of electric power supplied to the fuel pump. In a case where the efficiency of the fuel pump is increased under the same work output, the size of the motor arrangement can be reduced to downsize the fuel pump when the brushless motor is used in the motor arrangement instead of the brush motor. Furthermore, when the efficiency of the fuel pump is increased, the electric current supplied to the fuel pump can be reduced to reduce the electric power consumption of the fuel pump. The fuel pump, which uses the brushless motor to reduce its size and its electric power consumption, is particularly suitable for a small motorcycle, which has a relatively small fuel tank and a small electric supply power.

In the case of the fuel pump, in which fuel pressurized by the pump arrangement passes through the motor arrangement, it is desirable to limit contact between coils of the motor arrangement and the fuel. In Japanese Unexamined Patent Publication No. 2005-110477 and Japanese Unexamined Patent Publication No. 2005-110478, the stator of the motor arrangement is covered with resin to limit contact between the coils of the stator and the fuel. Furthermore, in Japanese Unexamined Patent Publication No. 2005-110477 and Japanese Unexamined Patent Publication No. 2005-110478, the gap, which is formed between the stator and the rotor, is used as a fuel passage for conducting the fuel that flows through the motor arrangement.

However, in the structure of Japanese Unexamined Patent Publication No. 2005-110477 and Japanese Unexamined Patent Publication No. 2005-110478, when the size of the gap is increased to create a sufficient passage cross sectional area for achieving the required fuel delivery quantity of the fuel pump, a magnetic force between the rotor and the stator is reduced to disadvantageously reduce the efficiency of the fuel pump.

In contrast, when the size of the gap between the stator and the rotor is reduced to increase the magnetic force between the rotor and the stator, the passage cross sectional area of the fuel passage, which is formed between the stator and the rotor, is reduced. As a result, the passage flow resistance is increased to disadvantageously reduce the efficiency of the fuel pump, and the required fuel delivery quantity may not be achieved in some cases.

SUMMARY OF THE INVENTION

The present invention addresses the above disadvantages. Thus, it is an objective of the present invention to provide a compact fuel pump, which has a relatively simple structure to achieve a sufficient passage cross sectional area for conducting fuel through a motor arrangement and to improve an efficiency of the fuel pump.

To achieve the objective of the present invention, there is provided a fuel pump, which includes a motor arrangement and a pump arrangement. The pump arrangement is driven by the motor arrangement to pressurize fuel. The motor arrangement includes a stator core, a plurality of coils, a rotor and dielectric resin. The stator core includes a plurality of teeth, which are arranged one after another in a circumferential direction. The plurality of coils is wound around the plurality of teeth. The plurality of coils switches magnetic poles, which are formed one after another along an inner peripheral surface of the stator core when energization of the plurality of coils is controlled. The rotor is rotatably arranged radially inward of the stator core and has magnetic poles of opposite polarities that are alternately arranged in a rotational direction of the rotor along an outer peripheral surface of the rotor, which is radially opposed to the stator core. A fuel passage is formed between the outer peripheral surface of the rotor and the inner peripheral surface of the stator core to conduct the fuel, which is pressurized by the pump arrangement. The dielectric resin is filled between each circumferentially adjacent two of the plurality of teeth to cover the plurality of coils. The dielectric resin is molded to form a plurality of clearances, each of which is formed between the corresponding circumferentially adjacent two of the plurality of teeth, to conduct the fuel that is pressurized by the pump arrangement.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

An embodiment of the present invention will be described with reference to the accompanying drawings.

Figure 2:
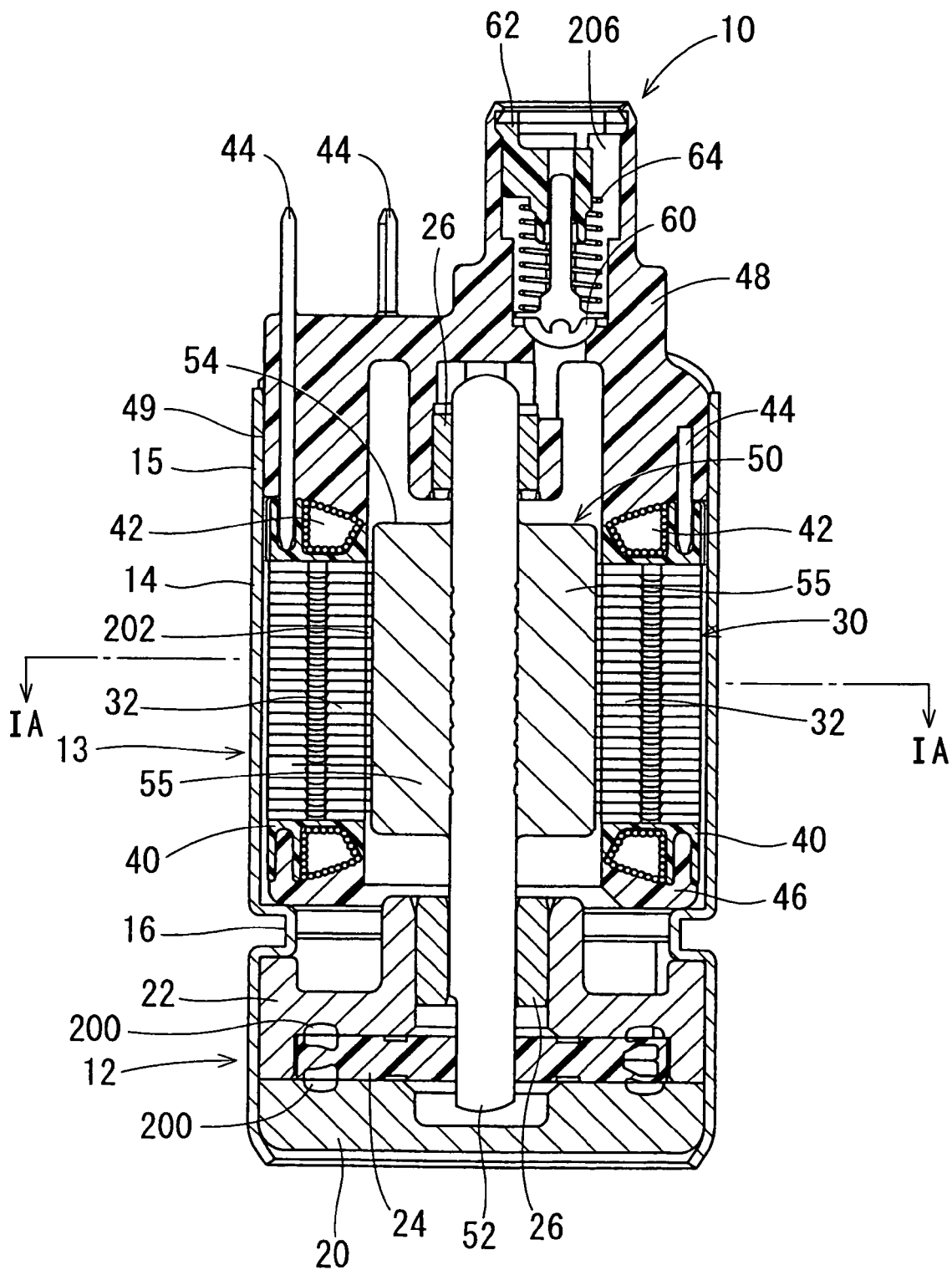
FIG. 2 is a cross sectional view of the fuel pump of the embodiment.

FIG. 2 shows a fuel pump according to an embodiment of the present invention. The fuel pump 10 of the present embodiment is an in-tank type turbine pump, which is placed in a fuel tank of a motorcycle with 150 cc or less displacement.

The fuel pump 10 includes a pump arrangement 12 and a motor arrangement 13. The motor arrangement 13 drives the pump arrangement 12 to rotate it. A housing 14 is made through press working of a thin metal plate of about 0.5 mm thickness into a cylindrical form. The housing 14 serves as a housing of the pump arrangement 12 and of the motor arrangement 13. The housing 14, which is made of the thin metal plate, forms a projecting portion 16, which is radially inwardly recessed into an inner peripheral side of the housing 14 at a location between the pump arrangement 12 and the motor arrangement 13.

The pump arrangement 12 is a turbine pump, which includes pump case segments 20, 22 and an impeller 24. The pump case segment 22 is press fitted into the housing 14 and axially abuts against the projecting portion 16 of the housing 14. In this way, the pump case segment 22 is axially positioned. The pump case segment 20 is fixed to one end of the housing 14 through swaging. In the case where the pump case segment 20 is fixed to the one end of the housing 14, a swaging support jig is fitted around an outer peripheral surface of the projecting portion 16 of the housing 14 to receive an axial force, which is generated at the time of swaging the housing 14 against the pump case segment 20.

Figure 1A:
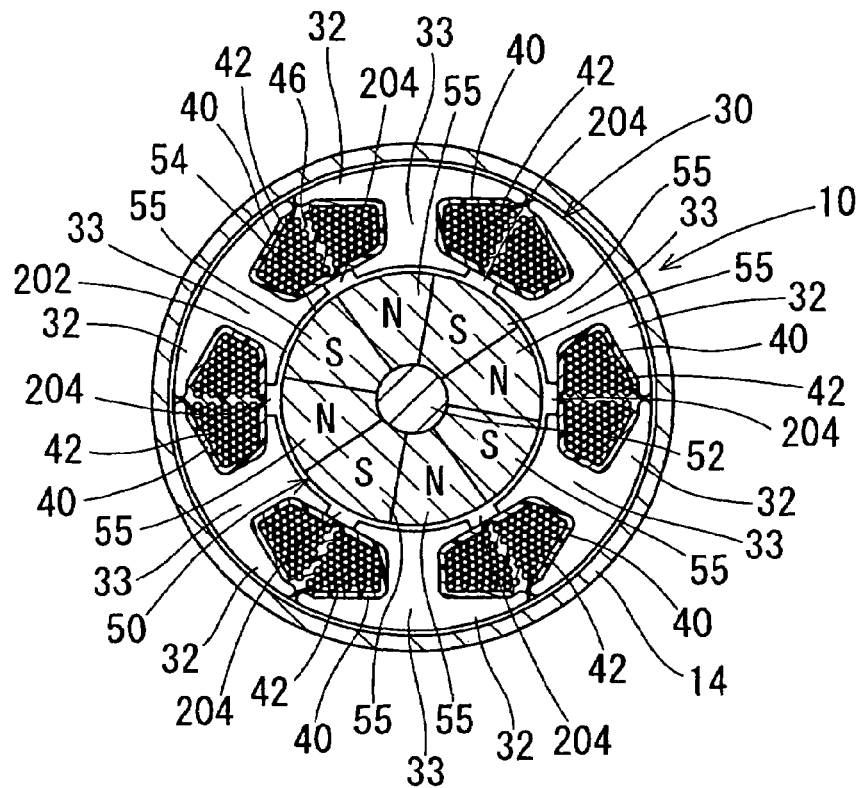
FIG. 1A is a cross sectional view along line IA-IA in FIG. 2, showing a fuel pump according to an embodiment of the present invention.
Figure 1B:
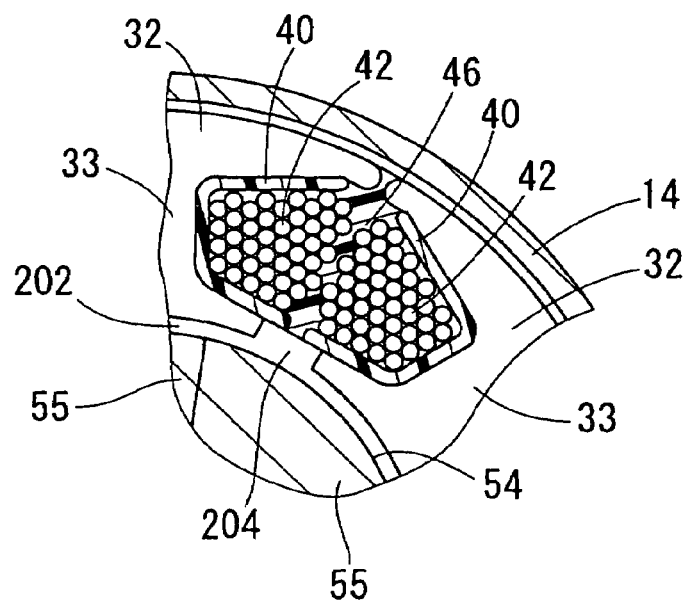
FIG. 1B is an enlarged partial cross sectional view depicting circumferentially adjacent teeth of a stator core shown in FIG. 1A.

The pump case segments 20, 22 form a pump case, which rotatably receives the impeller 24 that serves as a rotatable member. A C-shaped pump passage 200 is respectively formed between the pump case segment 20 and the impeller 24 and also between the pump case segment 22 and the impeller 24. Fuel is drawn through an inlet opening (not shown), which is formed in the pump case segment 20, and is pressurized in the pump passages 200 through the rotation of the impeller 24. Then, the pressurized fuel is outputted to the motor arrangement 13. The fuel, which is supplied to the motor arrangement 13, passes through a fuel passage 202, which is defined between a stator core 30 and a rotor 50, and also through clearances 204 (FIGS. 1A and 1B). Then, the fuel is outputted to an engine from an outlet opening 206, which is formed on the opposite side of the motor arrangement 13 that is axially opposite from the pump arrangement 12.

The motor arrangement 13 is a brushless motor and includes the stator core 30, bobbins 40, coils 42 and the rotor 50. The stator core 30 includes six cores 32, which are arranged one after another in a circumferential direction. A control apparatus (not shown) controls energization of the coils 42 according to a rotational position of the rotor 50 through three-phase full wave control, so that magnetic poles, which are formed in inner peripheral surfaces, respectively, of the cores 32 that are radially opposed to the rotor 50, are switched.

As shown in FIGS. 1A and 1B, each core 32 includes a tooth 33, which projects radially inward toward the rotor 50. Furthermore, each core 32 is made of a plurality of magnetic steel plates, which are stacked in the axial direction and are fixed together by swaging. Each bobbin 40, which is made of dielectric resin, is fitted around a corresponding one of the cores 32. Each coil 42 is formed such that a winding is wound around the bobbin 40 by using a concentrated winding technique while the core 32 is still in an unassembled state that is before assembly of the fuel pump 10. Each coil 42 is electrically connected to terminals 44 at an end cover 48 side of the coil 42 shown in FIG. 2.

The rotor 50 includes a shaft 52 and a permanent magnet 54 and is rotatably arranged radially inward of the stator core 30. The permanent magnet 54 is directly formed around a knurled outer peripheral surface of the shaft 52 through, for example, injection molding. Opposed ends of the shaft 52 are rotatably supported by bearings 26. The permanent magnet 54 is a cylindrical plastic magnet, which is formed by mixing magnetic powder into thermoplastic resin, such as polyphenylene sulfide (PPS) or polyacetal (POM). The permanent magnet 54 has eight magnetic poles 55, which are arranged one after another in the circumferential direction. The eight magnetic poles 55 are magnetized such that different polarities (opposite polarities) are alternately arranged in a rotational direction of the rotor 50 along an outer peripheral surface of the magnet 54.

Dielectric resin 46 is filled between each circumferentially adjacent two teeth 33 to cover the respective coil 42. Furthermore, the dielectric resin 46 integrally forms the end cover 48, which covers the opposite end of the stator core 30, which is opposite from the pump arrangement 12. An end portion 15 of the housing 14 is press fitted to an outer peripheral surface 49 of the end cover 48.

Furthermore, the dielectric resin 46 is molded in such a manner that each clearance 204 is formed between the corresponding circumferentially adjacent two teeth 33 at a rotator 50 side of the teeth 33. Thus, the fuel, which is pressurized in the pump arrangement 12, flows through the motor arrangement 13, by passing through the fuel passage 202, which is formed as the gap between the inner peripheral surface of the stator core 30 and the outer peripheral surface of the rotor 50, and also through the clearances 204, each of which is arranged between the corresponding circumferentially adjacent two teeth 33.

The outlet opening 206, which is formed by the end cover 48, receives a valve member 60, a stopper 62 and a spring 64. When the pressure of the fuel, which is pressurized in the pump arrangement 12, becomes equal to or greater than a predetermined pressure, the valve member 60 is lifted from a valve seat against a load applied from the spring 64, so that fuel is discharged from the outlet opening 206 to the engine.

In the small motorcycle, which has 150 cc or less displacement and the fuel pump 10 of the present embodiment, the rated fuel flow of 5 to 10 L/Hr is required at the engine. Upon consideration of a passage flow resistance of a fuel pipe and the like, which supply the fuel from the fuel pump 10 to the engine, the fuel pump 10 should have a fuel delivery quantity of about 10 to 20 L/Hr to achieve the above fuel flow. In order to achieve this fuel delivery quantity and to minimize the passage flow resistance in the motor arrangement 13, through which the fuel flows, a total passage cross sectional area of the fuel passage 202 and the clearances 204 needs to be equal o or greater than 1.3 $mm^2$.

Figure 3:
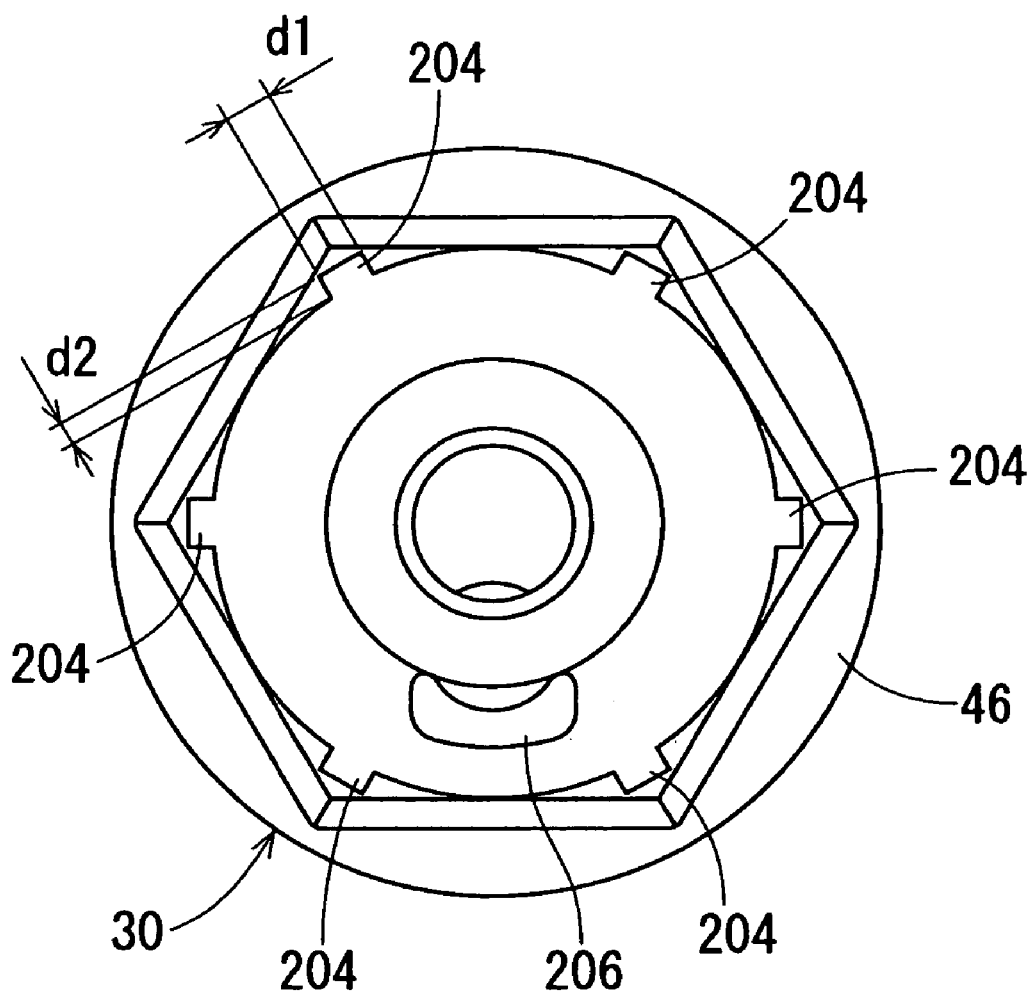
FIG. 3 is a descriptive diagram showing dielectric resin, which covers coils according to the embodiment.

As shown in FIG. 3, which is an end view of the dielectric resin 46 seen from the pump arrangement 12 side, according to the present embodiment, each clearance 204 has sizes of d1=0.9 mm and d2=0.5 mm, so that a passage cross sectional area (d1×d2) of each clearance 204 is 0.45 $mm^2$. Therefore, the total passage cross sectional area of all the six clearances 204 is 2.7 $mm^2$. Thus, the clearances 204 alone can satisfy the required passage cross sectional area of equal to or greater than 1.3 $mm^2$, which is required in the small motorcycle with 150 cc or less displacement.

As described above, in the present embodiment, the dielectric resin 46 is molded to have the clearances 204, each of which is formed between the corresponding circumferentially adjacent two teeth 33 to conduct the fuel. In this way, the required passage cross sectional area, which is required to achieve the required fuel delivery quantity, can be achieved without increasing the gap, i.e., the fuel passage 202, which is formed between the stator core 30 and the permanent magnet 54. Thus, it is easy to increase the passage cross sectional area for conducting the fuel through the motor arrangement 13 while maintaining the degree of the magnetic force, which is generated between the stator core 30 and the permanent magnet 54.

Furthermore, according to the present embodiment, the number (the total number) of the teeth 33 of the stator core 30 is set to be six (6), and the number (the total number) of slots of the stator, which includes the stator core 30 and the coils 42, is set to be six (6). Furthermore, the number (the total number) of magnetic poles of the rotor 50 is set to be eight (8). Thus, the number of magnetic poles of the rotor 50 is larger than the number of slots of the stator. In general, in the case where the circumferential angle of each tooth of the stator core and the circumferential angle of each magnetic pole of the rotor differ from each other, the amount of magnetic flux, which flows between the stator core and the rotor is generally defined by smaller one of the circumferential angle of the tooth of the stator core and the circumferential angle of the magnetic pole of the rotor. With the above construction of the present embodiment, even when the circumferential angle of the respective tooth 33 is changed closer to the circumferential angle of the respective magnetic pole 55, the amount of magnetic flux, which flows between the stator core 30 and the permanent magnet 54, will not change substantially. Thus, it is easy to increase the respective clearance 204 between the circumferentially adjacent teeth 33 and to increase the passage cross sectional area for conducting the fuel through the motor arrangement 13 while maintaining the degree of the magnetic force between the stator core 30 and the permanent magnet 54.

Furthermore, the dielectric resin 46 is filled in each space defined between the corresponding circumferentially adjacent two teeth 33 to cover the coils 42, so that the contact between the coils 42 and the fuel is limited with the simple structure.

Furthermore, as in the case of the present embodiment, when the plastic magnet, in which the magnetic powder is mixed into the thermoplastic resin, is used as the permanent magnet 54 in the rotor 50, the plastic magnet may possibly be swelled by the fuel. Particularly, in a case where degraded fuel or low grade fuel is used, and the fuel temperature reaches in a range of 60 to 80 degrees Celsius, the plastic magnet may swell to cause about 0.5% increase in the outer diameter of the rotor 50. When the outer diameter of the rotor 50 is increased, the passage cross sectional area of the fuel passage 202 between the rotor 50 and the stator core 30 is decreased. Thereby, the passage flow resistance is increased to decrease the efficiency of the fuel pump 10.

However, according to the present embodiment, the respective clearance 204 between the corresponding circumferentially adjacent teeth 33 can be used as the fuel passage. Thus, even in the case where the outer diameter of the rotor 50 is increased by the swelling to reduce the passage cross sectional area of the fuel passage 202, the required passage cross sectional area for conducting the fuel through the motor arrangement 13 can be still achieved, and the reduction in the efficiency of the fuel pump 10 can be minimized.

Furthermore, in the present embodiment, the winding is wound around each core 32 in the unassembled state, so that the winding can be easily wound around the core 32. Furthermore, the winding is wound by the concentrated winding technique, so that a space factor of the winding is increased. The space factor of the winding is a ratio of a total cross sectional area of the winding with respect to a winding space for the winding. When the space factor is increased, the total cross sectional area of the winding is decreased at the same winding amount. Thus, the coil 42 can be downsized. Threby, the fuel pump 10 can be further downsized.

Furthermore, in the present embodiment, the fuel flows through the location where the shaft 52 is journalled in the bearing 26. Thus, it is not required to seal a supporting portion of the end cover 48, which supports the bearing 26. Furthermore, the fuel lubricates the slidably engaging part between the shaft 53 and the bearing 26, so that it is possible to reduce the sliding resistance.

Now, modifications of the above embodiment will be described.

In the above embodiment, the stator, which includes the stator core 30 and the coils 42, has the six slots, and the rotor 80 has the eight magnetic poles. Thus, the number of magnetic poles of the rotor 50 is made larger than the number of slots of the stator to maximize the size of the respective clearance 204. Alternatively, as long as the number of magnetic poles of the rotor is larger than the number of slots of the stator, it is possible to have another combination, such as a combination of four magnetic poles and three slots or a combination of ten magnetic poles and eight slots.

Furthermore, as long as each required clearance is formed between the corresponding circumferentially adjacent two teeth by the dielectric resin, which is filled in the space between the circumferentially adjacent teeth and covers the coils, the number of magnetic poles of the rotor may be made smaller than the number of slots of the stator unlike the above embodiment.

Also, in the above embodiment, the pump arrangement 12 is made by the turbine pump, which includes the impeller 24. Alternatively, the pump arrangement may be made by another type of pump, such as a gear pump.

Additional advantages and modifications will readily occur to those skilled in the art. The invention in its broader terms is therefore not limited to the specific details, representative apparatus, and illustrative examples shown and described.

What is claimed is:

1. A fuel pump comprising a motor arrangement and a pump arrangement, wherein the pump arrangement is driven by the motor arrangement to pressurize fuel, and the motor arrangement includes:

a stator core that includes a plurality of teeth, which are arranged one after another in a circumferential direction;

a plurality of coils that are wound as high density windings around the plurality of teeth, said coils being disposed in respective coil winding spaces of said teeth, wherein the plurality of coils switches magnetic poles, which are formed one after another along an inner peripheral surface of the stator core when energization of the plurality of coils is controlled;

a rotor that is rotatably arranged radially inward of the stator core and has magnetic poles of opposite polarities that are alternately arranged in a rotational direction of the rotor along an outer peripheral surface of the rotor, which is radially opposed to the stator core, wherein a fuel passage is formed between the outer peripheral surface of the rotor and the inner peripheral surface of the stator core to conduct the fuel, which is pressurized by the pump arrangement; and dielectric resin that is filled between each circumferentially adjacent two of the plurality of teeth to cover the plurality of coils, wherein the dielectric resin is molded to form a plurality of clearances, each of said clearances being formed between the corresponding circumferentially adjacent two of the plurality of teeth and having a radially outer end located radially inward of the coils wound around said adjacent two teeth and radially inward of their respective coil winding spaces, to conduct the fuel that is pressurized by the pump arrangement, wherein stator core includes a plurality of divided cores, each of which has a corresponding one of the plurality of teeth, a dielectric bobbin is fitted around each of the plurality of divided cores, so that a corresponding one of the plurality of coils is wound around the dielectric bobbin, a radially outer wall of the dielectric bobbin forms a generally flat wall, a radially inner wall of the dielectric bobbin forms a generally flat wall, a distance between the radially outer wall and the radially inner wall progressively increases in a circumferential direction toward a circumferential opening of the dielectric bobbin, and a radial wall thickness of a radially outer wall of each divided core, which is located on a radially outer side of the radially outer wall of the dielectric bobbin, decreases in a circumferential direction toward a circumferential end of the radially outer wall of the divided core.

2. The fuel pump according to claim 1, wherein a total number of the magnetic poles of the rotor is larger than a total number of the teeth of the stator core.

3. The fuel pump according to claim 1, wherein a total cross sectional area of the fuel passage and the plurality of clearances is equal to or greater than 1.3 mm$^2$.

4. The fuel pump according to claim 1, wherein the dielectric resin is radially outwardly spaced from an inner peripheral surface of each of the plurality of teeth of the stator core.

5. The fuel pump according to claim 1, wherein a total cross sectional area of the plurality of clearances is equal to or greater than 1.3 mm$^2$.

* * * * *